United States Patent [19]

Finkelstein et al.

[11] 4,175,583
[45] Nov. 27, 1979

[54] REGULATOR VALVE

[75] Inventors: Wolfgang Finkelstein, Neukirchen-Vluyn; Gregor Baumeister, Krefeld; Josef Haaz, Neukirchen-Vluyn, all of Fed. Rep. of Germany

[73] Assignee: Gebruder Trox, Gesellschaft mit Beschrankter Haftung, Neikirchen-Vluyn, Fed. Rep. of Germany

[21] Appl. No.: 814,177

[22] Filed: Jul. 11, 1977

[51] Int. Cl.² ............................................. G05D 7/01
[52] U.S. Cl. ............................ 137/504; 137/505.13
[58] Field of Search ................ 137/499, 504, 505.13

[56] References Cited

U.S. PATENT DOCUMENTS

| | | | |
|---|---|---|---|
| 3,187,768 | 6/1965 | Waterfill | 137/499 X |
| 3,452,762 | 7/1969 | Fahre | 137/499 |
| 3,845,783 | 11/1974 | Lepeleire | 137/504 |

FOREIGN PATENT DOCUMENTS

| | | | |
|---|---|---|---|
| 83843 | 11/1957 | Denmark | 137/499 |
| 1435411 | 5/1976 | United Kingdom | 137/504 |

*Primary Examiner*—Robert G. Nilson
*Attorney, Agent, or Firm*—Shlesinger, Arkwright, Garvey & Dinsmore

[57] ABSTRACT

A regulator valve for maintaining a constant volumetric flow comprising a flap installed within a flow duct and pivotable from an open position to a closed position against the action of a biasing force, a bellows whose internal volume is in communication via an opening in the flap with the upstream side of the flap, the bellows further being joined to the downstream side of the flap and supported in the duct.

7 Claims, 6 Drawing Figures

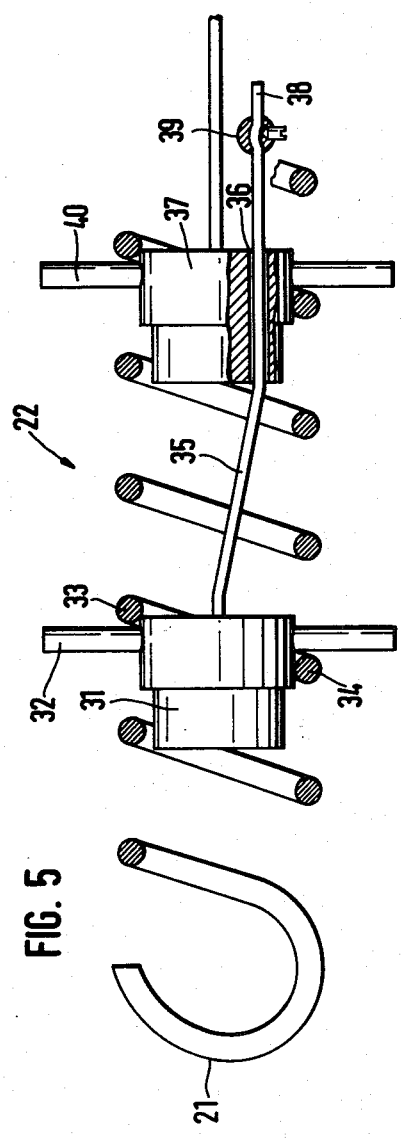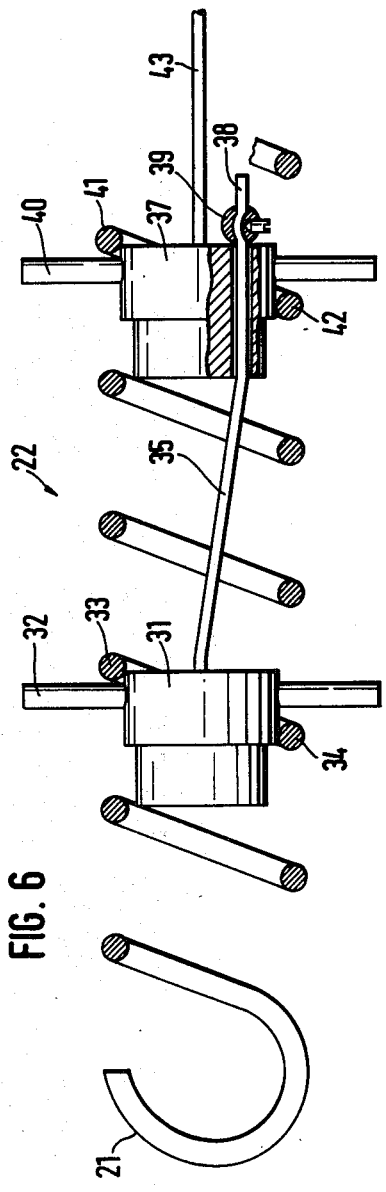

REGULATOR VALVE

This invention relates to a regulator valve intended to maintain a constant volumetric flow, particularly in air conditioning plants, the valve comprising a flap situated within a flow duct and pivotable from an open position into a closed position against a biasing force.

In a known valve of this kind, the flap is installed on a pivoting spindle positioned substantially centrally within the flow duct and borne on a torsion spring externally positioned on the flow duct. So that the volumetric flow may be kept constant at the incident flow side of the regulator valve under different pressures, the spring should have a spring rate which increases as the deflection of the spring increases. In the case of this known regulator valve, this is achieved in approximation by the torsion spring being a spiral spring acts as a flexing spring up to a given pivoting angle (say 30°) of the flap, and acts as a spiral spring beyond this. This results in a spring characteristic comprising two straight lines, but the control of the volumetric flow is too imprecise in this case. Also, the fact that a damping action on the flap displacement is absent, so that uncontrollable flap oscillations and corresponding fluctuations of the volumetric flow may occur, is a disturbing factor in the case of the known regulator valve.

A damping action on the flap displacement is established in the case of another known regulator valve, wherein the pivoting spindle of the flap is joined via a lever to the piston rod of a cylinder-piston system, the flap being biased by gravitational forces in a position which is rated for a particular minimum pressure at the incident flow side of the regulator valve. For this reason, this regulator valve may be inserted only in a specific assembly position.

All the known regulator valves are rated for a minimum pressure differential and provide for keeping the volumetric flow constant within a relatively narrow range only. There is a requirement for regulator valves which have a greater control range and which are still functional even at minimum pressure differentials, with little pressure loss and without fluctuations.

According to the present invention, there is provided a regulator valve for maintaining a constant volumetric flow comprising a flap installed within a flow duct and pivotable from an open position to a closed position against the action of a biasing force, a bellows, whose internal volume is in communication via an opening in the flap with the upstream side of the flap, being joined to the downstream side of the flap and supported in the duct.

In this system the pressure is propagated via the opening in the flap into the inside of the bellows and thereby increases the closing torque on the flap. For its part, this allows for the application of a stronger springs to provide the biasing force against whose action the flap is to be pivoted from the open position to the closed position. Lesser hysteretic effects, and thereby a higher precision of control, are obtained thereby. Moreover, the valve already responds at low air velocities. Beyond this, the system also has such satisfactory damping properties that further opening of the flap by pivoting is prevented even in the case of extreme pressure surges.

The bellows is preferably supported on a surface which is situated in a plane defined by the axis of pivoting of the flap and the longitudinal axis of the duct. In this position it does not interfere with the flow within the duct.

The amplification of the closing torque of the flap may be improved by arranging over the opening at the incident flow side of the flap a bent pipe stub whereof the open extremity is directed against the direction of flow. Not only the static pressure, but also the dynamic pressure of the flow are then picked up thereby and transmitted to the inside of the bellows.

In principle, the inventive regulator valve may be installed in any position, with the flap under corresponding weight equalisation. The flap may be mounted on a spindle having an end portion extending through the wall of the duct and carrying a balance weight installed on a lever, to provide for weight equalisation.

The lever is preferably a plate whereby no complementary torques are transmitted to the pivoting spindle, and the plate may act as an abutment for a spring secured on the wall of the duct, to provide said biasing force.

If a change is desirable of the parameter which is to be controlled, namely of the volumetric flow, the spring may also be held on a pivotally journalled adjusting lever which is coupled in articulated manner to a spindle of a servomotor. A remotely controlled adjustment of the volumetric flow, for example, is thereby possible.

Another adaptation of the characteristic of the reset force generated by the spring to the transmission function of the regulator valve may be obtained by the spring being a coil spring and an abutment displaceable up to a stop engaging between two adjacent turns of the coil spring. The abutment may in particular be a core which carries a rod extending in the longitudinal direction of the spring through an opening in another core and carring at its extremity a bead serving as a stop.

The invention will now be more particularly described by way of example only with reference to the accompanying drawings, in which:

FIG. 5 shows a return spring for a valve in an idle position in partial cross-section;

FIG. 6 shows the spring of FIG. 5 in a deflected state.

Figure 1:
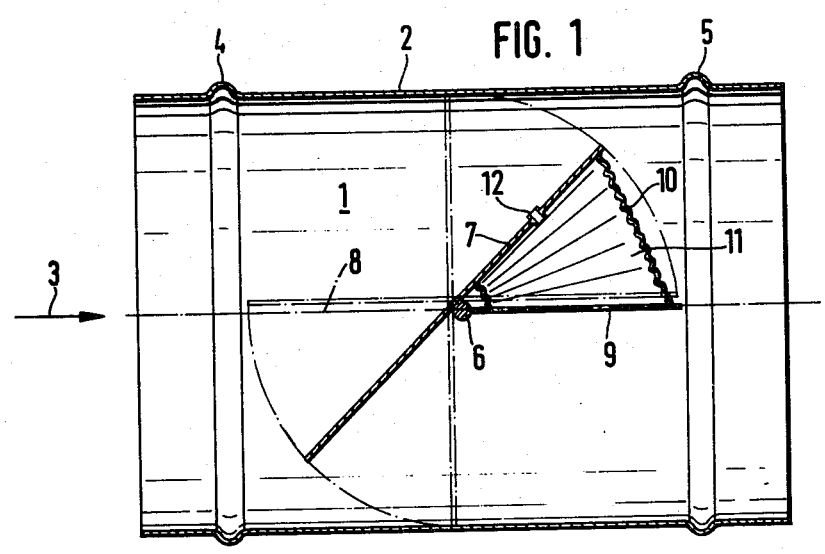
FIG. 1 is a longitudinal cross-section through a regulator valve for an air conditioning plant.

The regulator valve illustrated in FIG. 1 comprises a duct 1 which is formed by a pipe section 2 and through which air flows in the direction of the arrow 3. In the areas of its extremities, the pipe section 2 has peripheral annular ribs 4 and 5, so that it may be inserted up to these ribs into connecting pipes of an air conditioning plant.

A pivoting spindle 6 is arranged approximately in the middle of the duct 1 and carries a flap 7 which partially opens the duct cross-section in the position drawn in solid lines and closes off the duct cross-section when it is situated in the vertical position illustrated by dash-dotted lines.

In the duct 1, a stationary plate 9 is installed at the downstream side of the flap 7 in a plane defined by the axis of the pivoting spindle 6 and the longitudinal axis 8 of the duct 1. A bellows 10 whereof one extremity is connected to the downstream side of the flap 7, is joined at its other extremity in sealed manner to the plate 9. The internal volume 11 of the bellows 10 is in communication via an opening 12 in the flap 7 with the incident flow or upstream side of the flap 7. The static pressure on the upstream side of the flap 7 is thereby also effective within the internal volume 11 and reinforces the closing torque on the flap 7.

Figure 2:
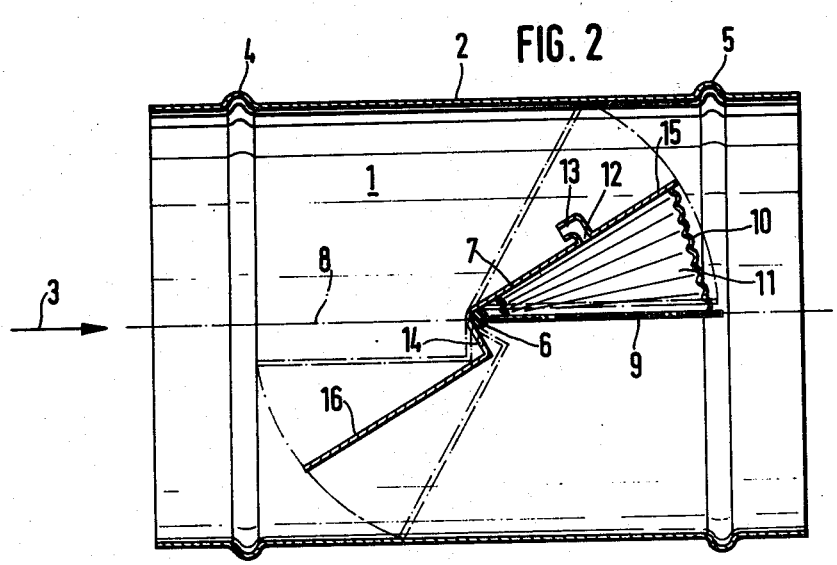
FIG. 2 is a cross-section through another form of regulator valve.

Identical reference numbers denote the same parts in the case of the alternative form of regulator valve illustrated in FIG. 2. The flap 7 is larger than in the case of the regulator valve FIG. 1, so that it shuts off the cross-section of the duct 1 in the oblique position shown by dash-dotted lines. The flap 7 carries on its upstream side and over the opening 12 a bent stub pipe 13 whose open extremity is directed against the direction of flow (arrow 3), so that apart from the static pressure, the dynamic pressure of the flow is transmitted to the internal volume 11 of the bellows 10.

Whereas the flap 7 is formed by a flat plate in the regulator valve of FIG. 1, in the case of the regulator valve of FIG. 2 the flap 7 has a stepped portion 14 in the area of the pivoting spindle 6, said portion being continued by a portion 16 extending parallel to the portion 15 resting on the bellows 10.

Comparing FIGS. 1 and 2, it will be noted that in the embodiment of FIG. 1, when the valve is initially in its fully open position, (the dotted line position), the air flow will be substantially parallel to the flap 7 and thus will be across the opening 12 rather than into the same. Thus, the static pressure is not substantially introduced into the interior of the bellows of FIG. 1 when the flap is fully opened. As the flap reaches substantially the solid line position of FIG. 1, wherein the flap is approximately at a 45° angle to the axis of the duct, the air flow although generally in the direction of the arrow 3, tends to become parallel to the flap 7 as its traverses the flap, and thus again the air flow is primarily across the opening 12 rather than into the same. As the flap continues to move towards the closed position more and more dynamic pressure is transmitted to the interior of the bellows.

On the other hand, in the embodiment of FIG. 2, when the flap is fully open, air flow is again parallel to the flap 7, but by virtue of the angled pipe 13, dynamic pressure is transmitted to the interior of the bellows 10. Even at the partially closed position, wherein the flow is substantially parallel to the flap 7, dynamic pressure is still introduced to the interior of the bellows. As the flap becomes closed, the dynamic pressure is decreased and primarily only static pressure exists at the closed position.

Figure 3:
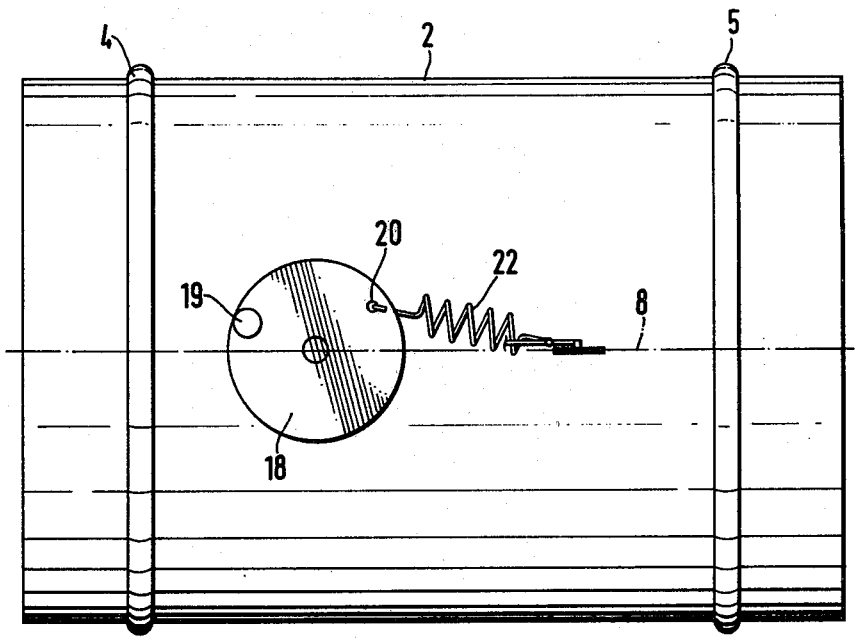
FIG. 3 is a side view of the valve of FIG. 1.
Figure 4:
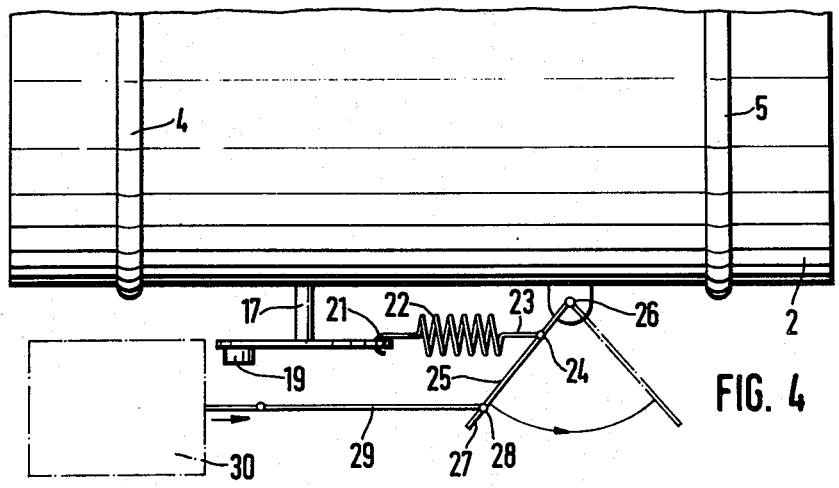
FIG. 4 is a plan view of the valve of FIG. 3.

As apparent from FIGS. 3 and 4, the pivoting spindle 6 of each valve has an end portion 17 led through the wall of the pipe section 2 and carrying a plate 18 whereon is fastened a balancing weight 19. The balancing weight 19 is so arranged that no turning moments resulting from gravitational forces act on the pivoting spindle 6 or the flap 7.

The plate 18 moreover has an opening 20 wherein is suspended via a hook 21 one extremity of a coil spring 22, whereof the other extremity 23 is coupled in articulated manner at 24 to a pivoting lever 25. The pivoting lever 25 is journalled in a swivel bearing 26 on the wall of the pipe section 2 and has its free extremity 27 connected via a joint 28 to a spindle 29 of a servomotor 30.

As shown in FIGS. 3 and 4, the coil spring 22 is not stressed, or only slightly stressed, for as long as the opening 20 is situated in the area of the longitudinal axis 8 during the pivoting of the pivoting spindle and the plate 18. It is only at greater pivoting angles that the coil spring 22 is deflected in increasing degree and thereby engenders a corresponding biasing force via the pivoting spindle 6 on the flap 7. The servomotor 8 which may be actuated by remote control and which upon being actuated pivots the lever 25, whereby the coil spring 22 is simultaneously prestressed in greater or lesser degree, serves the purpose of adjusting this biasing force and thus also the volumetric flow which is to be kept constant by the regulator valve.

A coil spring 22 having a characteristic corresponding to the transmission function of the regulator valve and with a spring rate which rises as the spring deflection increases is illustrated in FIGS. 5 and 6. A cylindrical core 31 inserted in the spring 22 has a transverse bore accomodating a bar 32 whose extremities project beyond the diameter of the spring 22 and engage with two adjacent turns 33,34, of the spring. The core 31 has a rod 35 which extends substantially in the longitudinal direction of the coil spring 22 through an opening 36 in another core 37 held within the coil spring 22, and at its extremity 38 carries a bead 39 which cannot pass through the opening 36. The core 37 also has a rod 40 which engages with adjacent turns 41,42 of the spring, and is held stationary by a rod 43.

As apparent from a comparison of FIGS. 5 and 6, which show respectively un-stressed and stressed states of the spring, all the turns of the coil spring 22 are deflected uniformly initially upon applying a tractive force on the hook 21, the core 31 being entrained by the turns 33,34 until the bead 39 of the rod 35 impinges on the core 37. Upon continued increase of the tractive force, it is then only the windings or winding sections present between the hook 21 and the core 31 which are deflected, spring rate increasing commensurately with the reduction in the number of turns of the coil spring. The spring characteristic may thus be made to correspond substantially to the transmission function of the regulator valve illustrated.

We claim:

1. A regulator valve for maintaining a constant volumetric flow comprising a flap having upstream and downstream faces installed within a flow duct and pivotable from an open position to a closed position, means biasing said flap toward said open position, a support plate lying in a plane defined by the pivoting axis of said flap and the longitudinal axis of said duct, a bellows supported on said support plate on the downstream side of said flap and connected to said flap, inlet means establishing a flow passage from the upstream side of said flap to the interior of said bellows and being open against the direction of flow for transmitting dynamic pressure of flow to the interior of said bellows for expanding said bellows and thereby urging said flap toward said closed position.

2. A regulator valve according to claim 1, wherein said flap is mounted on a pivoting spindle having an end portion extending through the wall of said duct and carrying a balance weight situated on a lever.

3. A regulator valve according to claim 2, wherein said lever is in the form of a plate.

4. A regulator valve according to claim 3, wherein said plate carries an abutment for engagement by a spring mounted outside said duct and comprising said biasing means.

5. A regulator valve according to claim 4, wherein said spring is secured on a pivotally journalled adjusting lever which is connected in jointed manner to a spindle of a servomotor.

6. A regulator valve according to claim 5, wherein said spring is a coil spring and an abutment displaceable up to a stop engages between two adjacent turns of the coil spring.

7. A regulator valve according to claim 6, wherein said abutment is a core carrying a rod extending in the longitudinal direction of the spring through an opening in another core and carrying at its extremity a bead serving as a stop.

* * * * *